UNITED STATES PATENT OFFICE.

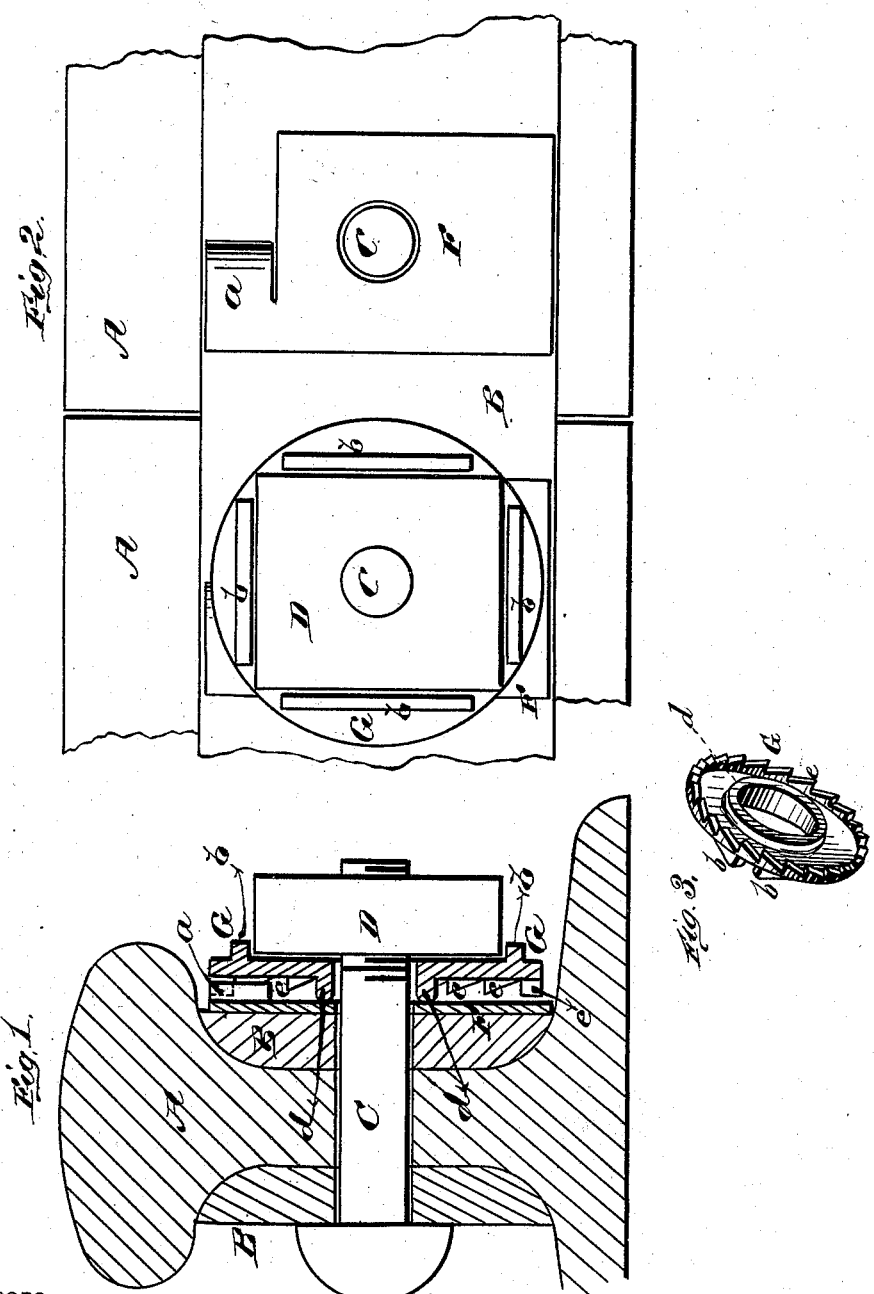

RICHARD A. KELLY, OF MANCHESTER, IOWA.

IMPROVEMENT IN NUT-LOCKS.

Specification forming part of Letters Patent No. 203,464, dated May 7, 1878; application filed February 2, 1878.

*To all whom it may concern:*

Be it known that I, RICHARD A. KELLY, of Manchester, in the county of Delaware and State of Iowa, have invented a new and valuable Improvement in Nut-Locks; and I do hereby declare that the following is a full, clear, and exact description of the construction and operation of the same, reference being had to the annexed drawings, making a part of this specification, and to the letters and figures of reference marked thereon.

Figure 1 of the drawings is a transverse vertical sectional view of my nut-lock, and Fig. 2 is a side view thereof, showing one of the nuts removed. Fig. 3 is a perspective view of the cast-metal washer.

The nature of my invention consists in the construction and arrangement of a device for locking nuts on bolts designed for railroad-rail joints and other purposes, as will be hereinafter more fully set forth.

The annexed drawings, to which reference is made, fully illustrate my invention.

A A represent the ends of two adjacent railroad-rails, with fish-bars B B, bolts C C, and nuts D D, all constructed in any of the known and usual ways. On the end of each bolt C, next to the fish-bar, is placed a sheet-metal washer, F, which is of such size as to extend down to the foot of the rail, and can hence not turn in any direction. One side, preferably at the top, of this sheet-metal washer is cut to form an outwardly-bent spring-pawl, $a$, as shown. Next to this washer F comes a cast-metal washer, G, and then the nut D is screwed on. The washer G is, on its outer face, provided with flanges, ribs, or other projections $b$ $b$, within which the nut D fits, so that the washer G and nut D will be turned together. The washer G is, on its inner face, provided with a circle of ratchet-teeth or radial notches, $e$ $e$, which are set on such a slant that, as the nut is turned on, said teeth will ride over the spring-pawl $a$, and said pawl engages with the teeth to prevent the nut from turning back. By pressing back the pawl $a$ the nut and washer can be turned backward.

The washer G is further, on its inner face, provided with a circular collar, $d$, around the bolt-hole, said collar extending beyond the teeth $e$, so that while the collar presses the pawl-washer F firmly against the fish-bar, no other part of the appliance can interfere with the working of the pawl.

By the inclosure formed on the outer face of the washer G by means of the projections $b$, I am enabled to use any shape of nut. In some cases I may form the nut D and washer G of one piece, or, in other words, form the nut with the projecting collar $d$ and the radial teeth $e$. This nut-lock is, of course, applicable upon any articles, and in any place where a bearing can be found for one side of the pawl-washer F.

What I claim as new, and desire to secure by Letters Patent, is—

In combination with an ordinary bolt and nut, the sheet-metal washer F, forming a spring-pawl, $a$, and the cast-metal washer G, formed on its inner face with a series of radial teeth, $e$, and a central projecting collar, $d$, and having upon its outer face an inclosure to receive the nut, all substantially as and for the purposes herein set forth.

In testimony that I claim the above I have hereunto subscribed my name in the presence of two witnesses.

RICHARD A. KELLY.

Witnesses:
MILLARD F. LE ROY,
CHAS. E. BRONSON.